March 23, 1965
F. D. WERNER ETAL
3,174,342
RESISTANCE TEMPERATURE DETECTOR
Filed June 13, 1961
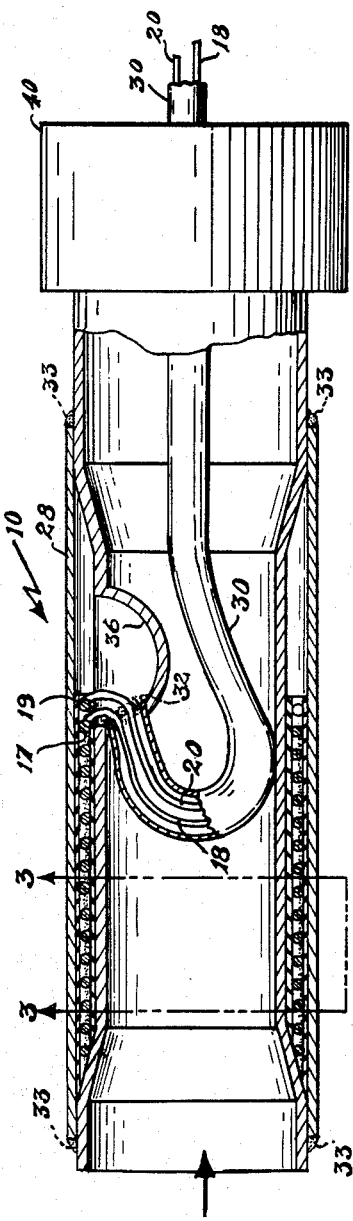
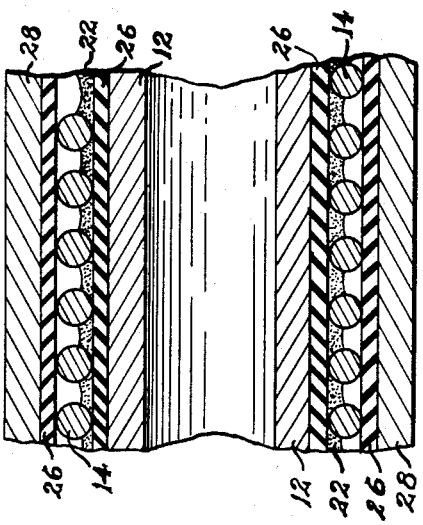
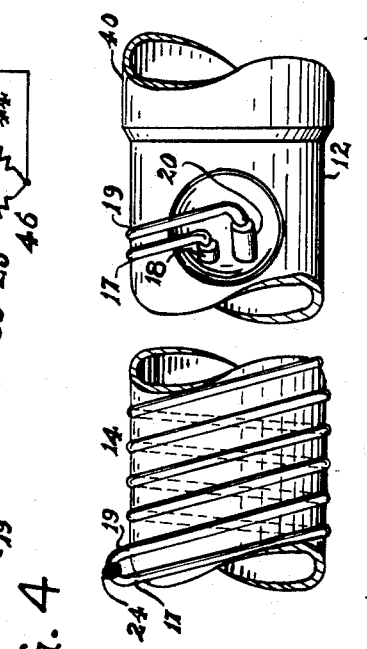
INVENTORS
FRANK D. WERNER
& ROBERT B. KEPPEL
BY
ATTORNEYS

United States Patent Office 3,174,342
Patented Mar. 23, 1965

3,174,342
RESISTANCE TEMPERATURE DETECTOR
Frank D. Werner and Robert E. Keppel, Minneapolis, Minn., assignors to the United States of America as represented by the Secretary of the Air Force
Filed June 13, 1961, Ser. No. 116,897
2 Claims. (Cl. 73—362)

The present invention relates to temperature detectors and, more specifically, to an improved resistance element useful for high speed gas temperature measurements and for low speed gas or liquid temperature measurements.

Many types of resistance thermometers are in use and are based on the well-known principle that the resistance of a conductor changes with temperature. In general, resistance thermometers consist of a calibrated coil of wire which is placed in the location where the temperature is to be measured, permitting accurate measurements over a wide temperature range to be read from a remote point.

Most prior art devices isolate the temperature-responsive element from the medium whose temperature is to be measured. This isolation delays the response of the resistance element to changing temperatures. Other devices having the resistance element open to the atmosphere have less than the desired sensitivity, ruggedness, sensitivity to humidity, stability, accuracy and rapidity of response.

Accordingly, it is an object of this invention to provide a resistance element having very small thermal capacity, together with large surface area for measurements of high accuracy with rapid response to temperature changes in a fluid medium.

Another object of this invention is to provide a resistance element which is hermetically sealed against contamination, corrosion and water entrance.

A further object of this invention is to provide a resistance element suitable for use with a sonic orifice for total temperature measurement at high subsonic or supersonic speeds.

Still another object of this invention is to provide a resistance element with improved attachment to lead-in conductors to minimize thermal conduction between the sensing element and the environment.

A still further object of this invention is to provide a resistance element with low inductive reactance due to the resistance windings.

A still further object of this invention is to provide a resistance element which is of simple construction and low cost.

In accordance with this invention, the resistance element is a 2-mil platinum wire wound in a bifilar relationship around a thin-walled, platinum housing defining one of three concentric chambers, the said housing also serving as a protective element to minimize thermal stress in the sensing element wire and electrically insulated therefrom. An outer thin-walled platinum tubing defining a second chamber adjacent to said resistance wire and electrically insulated therefrom minimizes radiation errors. The ends of the inner and outer tubings first and second chambers are hermetically sealed thereby forming a third thin chamber to prevent corrosion, air contaminants, etc. from affecting the resistance wire. The method by which the leads are brought to the resistance element permits a substantial length of the electrical leads to be immersed in the fluid whose temperature is to be measured, thereby minimizing thermal conduction errors between the sensing element and the environment. By the use of 0.020 inch gold wire, and by grounding one end of the resistance element, negligible lead resistances have been obtained. In the vicinity of both ends of the leads a hermetic seal is provided so that the desirable feature of overall hermetic sealing will be realized.

An unexpected result is that although even non-inductively wound wire resistances have appreciable inductive reactance, because of the novel design of the resistance element, the reactance was found to be capacitive.

For high speed gas measurement applications, the resistance element is designed for use with a sonic orifice downstream of the resistance wire, said orifice controlling the environment in the vicinity of the sensing element. For low speed gas or liquid temperature measurements, the sonic orifice at the rear of the resistance element is unnecessary and a device common to the art such as an aspirator may be adapted to maintain flow.

The further details of the invention and objects and advantages thereof may be had from a consideration of the detailed description which follows, taken together with the accompanying drawings, wherein one presently preferred embodiment of the invention is illustrated by way of example.

FIGURE 1 is a cross-sectional view of the resistance element in said preferred embodiment;

FIGURE 2 is a detail view showing the physical relationship of the resistance wire to the inner shell and the lead wires;

FIGURE 3 is an enlarged view of the resistance wire of the sensing element taken along the line 3—3 from FIGURE 1;

FIGURE 4 is a schematic of the electric circuit of the resistance element.

Referring now to FIGURE 1, there is illustrated a sectional view of resistance element 10 as an integral part of a total temperature probe wherein casing 40 includes sonic orifices and bleed holes (not shown) as described in our co-pending application Serial No. 116,898, entitled "Total Temperature Probe" and filed on even date herewith. FIGURE 3 is an enlarged view of the resistance wire on the sensing element taken along the line 3—3 from FIGURE 1.

Platinum, thin-walled tubing 12 serves as the mandrel for resistance wire 14. A sheet of insulating mica 16 covers the mandrel 12. The resistance wire 14 is 0.002 inch diameter platinum wire about 40 inches long. End 17 of resistance wire 14 is wrapped around the end of gold wire lead 18, said gold wire being fused thereto to insure connection. The other end 19 of the platinum wire is connected in a similar manner to the other lead wire 20. The resistance wire is then wound on the mica-covered mandrel 12 in the form of a double thread. Refractory cement 22 is then painted between the platinum resistance wires, said resistance wires being wound in a bifilar relationship to tubing 12. The composite structure is then fired for annealing purposes. The resistance of the wire 14 is then adjusted to 49.8±0.10 ohms at 0° C. by shortening the resistance wire; i.e. at the U-shaped end 24, the wire being cut to a length corresponding to the desired resistance with the ends welded together. The final step is to anneal the resistance wire at progressively higher temperatures until the resistance is 50±0.05 ohms.

Another sheet of mica insulation 26 is laid over the wire 14 and the leads 18 and 20 to electrically insulate said wire and leads from the outer tube 28.

The two gold wire leads 18 and 20 with substantially 0.020 inch diameter are insulatedly disposed within a curved platinum-gold alloy tube 30. Conduit 30 is connected by means of gold soldered hermetic seal 32, to the cutout in the depressed portion 36 of inner tube 12.

Outer tubing 28 and inner tubing 12 are gold soldered together around the ends 33 of the encasing tubes, and when a hermetic terminal (not shown) is properly attached to the outer ends of the lead-in wire, the resistance element is hermetically sealed against contamination, corrosion, water entrance, etc.

At this point, it is well to note that outer tubing 28 acts as a radiation shield minimizing radiation errors.

The two cylindrical sections 12 and 28 are fabricated from pure platinum so that these sections will expand and contract together with the platinum resistance wire 14, thereby eliminating thermal stresses.

An important advantage of the present invention is the reduction of thermal conduction errors by the novel manner in which long, low-resistance lead-in conductors 18 and 20 are attached to ends 17 and 19 of resistance wire 14 with a relatively long immersion in the fluid whose temperature is to be measured. This long immersion minimizes thermal conduction between the sensing element 10 and environment by way of lead-in conductors.

By the use of 0.020 inch diameter pure gold wire, and by grounding one side of the resistance element, we have found it is practical to obtain lead resistance which is only 0.012% of the 50 ohms resistance 14 representing only 0.03 C, and is therefore negligible.

FIGURE 4 is a diagram of the electrical circuit comprising windings 17 and 19 of resistance wire 14, soldered junction 24 of the resistance wire, leads 18 and 20 and connections 37 and 39 to an external, conventional resistance measuring circuit 38 which may be at any desired distance from the sensing element.

To observe or record these resistance changes, means 38 can be a Wheatstone bridge including resistors 42, 44 and 46 in the legs thereof and incorporating resistance wire 14 at connections 21 and 23 as the other leg thereof, and galvanometer 48 and D.-C. voltage source 52. Also, a high gain, D.-C. amplifier may be used to detect the unbalance due to a change in temperature changing the resistance of wire 14 in a bridge measuring circuit, said amplifier having an output sufficient to drive a strip-chart recorder and/or the output can be applied as an input of temperature to air data computers, fire control systems, and the like.

The resistance versus temperature relationship of the platinum resistance wire follows the well-known Callender-Van Dusen relationship and is useful over the temperature range −183° C. to 1200° C. Therefore, temperature observations or recordings of resistance changes can be directly obtained based on a prior calibration curve of wire resistances providing scales calibrated in degrees.

An unexpected result, because of the novel design of sensitive element 10, is that the reactance was found to be capacitive. Ordinarily, even non-inductively wound wire resistances have appreciable inductance. But because the sensing element of the present invention has a closely fitted grounded cylinder, both inside and outside of the winding 14, the reactance was capacitive. It is known that the main effect of frequency is to change the apparent resistance, but we have found the resistance element may be operated satisfactorily up to about 10 kc. or more.

The improved resistance element as above constructed is: rugged; thermal shock and vibration cause negligible effect on the sensing element; stable; has negligible self-heating due to e.g. 10 milliamperes of current passing through the wire; insensitive to external pressure up to 400 p.s.i.g.; corrosion and water entrance proof; and has a thermal time constant of less than 2 seconds.

Although the present invention has been described in conjunction with particular embodiments, it should be realized that various changes, substitutions, combinations or modifications may be made without departing from the scope of this invention. Accordingly, the present invention should be interpreted by the appending claims.

What we claim is:

1. A resistance temperature detector for high speed gas temperature measurement comprising a first chamber having an opening therein through which a fluid medium flows, said chamber having a depressed portion at the approximate longitudinal center thereof, a second chamber having an opening of larger diameter than said first chamber, said first chamber being included in said second chamber in spaced relationship thereto and hermetically connected at each end thereof, to provide a double shelled wall defining the said two chambers and in turn establishing a third relatively thin chamber between the inner and outer walls of said shell, and located within said third chamber a temperature-sensitive element in spaced relationship thereto and electrically insulated therefrom, said temperature-sensitive element being a metal wire having a length substantially greater than its diameter to provide rapid response to temperature changes, said wire being wound around said first chamber in a bifiliar relationship thereto to enhance the response of said wire to temperature changes in said first chamber, and a device adapted to measure the resistance of said temperature-sensitive element, said device including electrical low resistance, thin-wire, lead-in conductors hermetically connected at one end thereof to said depressed portion to have a relatively long immersion in the fluid whose temperature is to be measured to minimize thermal conduction between said temperature detector and said fluid.

2. The method of connecting a resistance temperature detector to electrical low resistance, thin-wire, lead-in conductors, comprising the steps of depressing the downstream portion of a mandrel on which said resistance wire will be wound, which mandrel is immersed in the fluid whose temperature is to be measured, connecting corresponding ends of said resistance wire and said lead-in conductors at said depressed portion, winding said wire around said mandrel, and adjusting to a predetermined resistance the total resistance of said resistance wire and said conductors at the other end of said resistance wire to provide an electrical connection whereby long immersion of said conductors in said fluid minimizes thermal conduction errors between said resistance wire and said conductors.

References Cited by the Examiner
UNITED STATES PATENTS

| | | | |
|---|---|---|---|
| 2,307,626 | 7/40 | Kelly | 73—362 |
| 2,379,530 | 9/41 | Lederer | 73—362 |
| 2,588,840 | 9/46 | Howland | 73—349 |
| 2,967,429 | 1/61 | Taylor | 73—359 |

ISAAC LISANN, *Primary Examiner.*